US012729272B2

(12) United States Patent
Murayama

(10) Patent No.: US 12,729,272 B2
(45) Date of Patent: Sep. 8, 2026

(54) AROMATIC POLYIMIDE POWDER FOR MOLDED BODY, MOLDED BODY USING SAME, METHOD FOR IMPROVING MECHANICAL STRENGTH OF MOLDED BODY

(71) Applicant: UBE Corporation, Ube (JP)

(72) Inventor: Hirotaka Murayama, Ube (JP)

(73) Assignee: UBE CORPORATION, Ube (JP)

( * ) Notice: Subject to any disclaimer, the term of this patent is extended or adjusted under 35 U.S.C. 154(b) by 792 days.

(21) Appl. No.: 17/905,993

(22) PCT Filed: Mar. 11, 2021

(86) PCT No.: PCT/JP2021/009928
§ 371 (c)(1),
(2) Date: Sep. 9, 2022

(87) PCT Pub. No.: WO2021/182589
PCT Pub. Date: Sep. 16, 2021

(65) Prior Publication Data

US 2023/0109481 A1 Apr. 6, 2023

(30) Foreign Application Priority Data

Mar. 13, 2020 (JP) ................................ 2020-043788

(51) Int. Cl.
*C08G 73/10* (2006.01)
*C08L 79/08* (2006.01)
*C09D 179/08* (2006.01)

(52) U.S. Cl.
CPC .......... *C08G 73/1067* (2013.01); *C08L 79/08* (2013.01); *C09D 179/08* (2013.01)

(58) Field of Classification Search
CPC ............. C08G 73/10; C08L 79/08; C08J 3/12
See application file for complete search history.

(56) References Cited

U.S. PATENT DOCUMENTS 4,755,428 A * 7/1988 Noda ................. C08G 73/1085 528/188
6,054,177 A * 4/2000 Endoh ..................... B29B 15/12 427/195
2002/0052463 A1* 5/2002 Yamaguchi ........ C08G 73/1028 528/229
2015/0166730 A1* 6/2015 Ungerank ............... C08L 79/08 428/407

FOREIGN PATENT DOCUMENTS

| | | | |
|---|---|---|---|
| JP | 62132960 | A | 6/1987 |
| JP | 06-207015 | A | 7/1994 |
| JP | 10-045918 | A | 2/1998 |
| JP | 11-302380 | A | 11/1999 |
| JP | 2002-103363 | A | 4/2002 |
| JP | 2002-128893 | A | 5/2002 |
| JP | 2007-016222 | A | 1/2007 |
| JP | 2007-112927 | A | 5/2007 |
| JP | 2019-059835 | A | 4/2019 |
| JP | 2019-089998 | A | 6/2019 |
| WO | WO 2015/005271 | A1 | 1/2015 |
| WO | WO 2017/179367 | A1 | 10/2017 |

OTHER PUBLICATIONS

International Search Report and Written Opinion issued in Application No. PCT/JP2021/009928, mailed Apr. 20, 2021.

* cited by examiner

*Primary Examiner* — Gregory Listvoyb
(74) *Attorney, Agent, or Firm* — Knobbe Martens Olson & Bear LLP

(57) ABSTRACT

An aromatic polyimide powder for a molded body, in which a volatile matter content contained in the aromatic polyimide powder is 0.50 to 5.00% by mass relative to 100% by mass of the aromatic polyimide powder of 25° C., and when molded, the aromatic polyimide powder provides an aromatic polyimide molded body having a flexural strength of 60 MPa or more.

6 Claims, No Drawings

AROMATIC POLYIMIDE POWDER FOR MOLDED BODY, MOLDED BODY USING SAME, METHOD FOR IMPROVING MECHANICAL STRENGTH OF MOLDED BODY

This application is the U.S. National Phase under 35 U.S.C. § 371 of International Application PCT/JP2021/009928, filed Mar. 11, 2021, designating the U.S., and published in Japanese as WO 2021/182589 on Sep. 16, 2021, which claims priority to Japanese Patent Application No. 2020-043788, filed Mar. 13, 2020, the entire content of which is incorporated herein by reference.

TECHNICAL FIELD

The present invention relates to a polyimide powder for a molded body which can provide a molded body having improved mechanical strength, a molded body formed using the same, and a method for improving the mechanical properties of a molded body.

BACKGROUND ART

Aromatic polyimides, which are produced from aromatic tetracarboxylic acid components and aromatic diamine components as raw materials, have excellent properties such as heat resistance, mechanical strength, electrical characteristics, and solvent resistance, which enable them to be widely used as materials for electrical/electronic components and the like. In particular, aromatic polyimide powders, which are processed into powder, have been widely used as materials for producing parts for industrial production apparatuses because they can be formed into desired molded bodies, for example, by placing in a mold and applying pressure.

In recent attempts to further extend the range of application of aromatic polyimide powders utilizing their properties, a highly functional aromatic polyimide powder has been actively sought. For example, techniques for mixing a polyimide powder and a variety of materials have been developed. Patent Document 1 discloses a technique to provide a molded body for an electrical/electronic component by mixing a polyimide powder and a conductive carbon. Patent Document 2 discloses a technique to impart wear resistance and mechanical strength by mixing a polyimide powder, an inorganic fibrous filler, and a solid lubricant. Patent Document 3 discloses a technique to improve the handleability of a polyimide powder by mixing the polyimide powder with a fluorine-containing resin powder.

However, such mixing with an additive or resin other than polyimide powders reduces the relative proportion of the polyimide powder, so that the properties inherent in the polyimide powder cannot be sufficiently demonstrated.

To solve the problem, the use of techniques to chemically modify a polyimide powder is growing. For example, Patent Document 4 discloses using a soluble polyimide, and Patent Document 5 discloses a technique to incorporate a fluorine-containing functional group such as a 2-hydroxy-1,1,1,3,3,3-hexafluoroisopropyl group.

RELATED ART DOCUMENTS

PATENT DOCUMENTS

Patent Document 1: Japanese Patent Application Laid-Open No. 2007-016222

Patent Document 2: Japanese Patent Application Laid-Open No. 62-0132960

Patent Document 3: International Publication No. WO 2015/005271

Patent Document 1: Japanese Patent Application Laid-Open No. 2019-059835

Patent Document 1: Japanese Patent Application Laid-Open No. 2019-089998

SUMMARY OF THE INVENTION

PROBLEM TO BE SOLVED BY THE INVENTION

Unfortunately, the use of a soluble polyimide as described in Patent Document 4 leads to producing a molded body having impaired solvent resistance, and the function of the polyimide is unlikely to be sufficiently demonstrated. Likewise, the incorporation of a fluorine-containing functional group as described in Patent Document 5 increases the solubility of the polyimide powder in solvents, and consequently leads to producing a molded body having impaired solvent resistance. Thus, the conventionally known techniques fail to allow aromatic polyimide powders to sufficiently exhibit their properties, and particularly tend to impair solvent resistance and mechanical properties.

The present invention is devised to solve the problem, and much trial and error to enhance mechanical properties without deteriorating solvent resistance surprisingly revealed a correlation between the volatile matter content of an aromatic polyimide powder and the mechanical properties of a molded body of the aromatic polyimide. Accordingly, a purpose of the present invention is to provide an aromatic polyimide powder which can fully exhibit its properties. In particular, a purpose of the present invention is to provide an aromatic polyimide powder which can be formed into an aromatic polyimide molded body having excellent mechanical properties. Another purpose of the present invention is to provide a method for improving the mechanical properties of an aromatic polyimide molded body to provide a molded body having excellent mechanical properties.

MEANS FOR SOLVING PROBLEMS

The present invention particularly relates to the following items:

1. An aromatic polyimide powder for a molded body wherein a volatile matter content contained in the aromatic polyimide powder is 0.50 to 5.00% by mass relative to 100% by mass of the aromatic polyimide powder of 25° C. An aromatic polyimide molded body formed by molding the aromatic polyimide powder for a molded body according to the present invention preferably has a flexural strength of 60 MPa or more.
2. A method for producing the aromatic polyimide powder for a molded body described in 1, the method comprising a volatile matter adjustment step of adjusting the total volatile matter content contained in the polyimide powder within the range of 0.50 to 5.00% by mass relative to 100% by mass of the aromatic polyimide powder of 25° C.
3. The method for producing the aromatic polyimide powder for a molded body, wherein the volatile matter adjustment step described in 2 comprises a washing step and/or a drying step.

4. The method for producing the aromatic polyimide powder for a molded body, wherein the washing step described in 3 comprises a washing step using an alcohol.
5. An aromatic polyimide molded body formed by molding the aromatic polyimide powder for a molded body described in 1, and having a flexural strength of 60 MPa or more.
6. A method for improving the mechanical strength of an aromatic polyimide molded body, the method comprising adjusting the volatile matter content of an aromatic polyimide powder as a raw material to 0.50 to 5.00% by mass relative to 100% by mass of the aromatic polyimide powder of 25° C.

EFFECTS OF INVENTION

The present invention can provide an aromatic polyimide powder which can provide an aromatic polyimide molded body having excellent mechanical properties without deteriorating solvent resistance, and a method for producing the same. Additionally, the present invention can provide a method for improving the mechanical properties of an aromatic polyimide molded body. According to the present invention, an aromatic polyimide powder which can provide a molded body having significantly enhanced mechanical strength can be obtained by a simple process of adjusting the volatile matter content. Thus, the present invention is industrially innovative.

DESCRIPTION OF EMBODIMENTS

<Aromatic Polyimide Powder for Molded Body>

The following description begins with a description of an aromatic polyimide powder for a molded body according to the present invention. The aromatic polyimide powder for a molded body according to the present invention has a volatile matter content of 0.50 to 5.00% by mass. The term "volatile matter" herein refers to components which volatilize in the temperature range of 50 to 350° C. A feature of the present invention is that the volatile matter is present in an amount of 0.50 to 5.00% by mass relative to 100% by mass of the aromatic polyimide powder of 25° C. Specifically, in the case where the amount of components which volatilize in the temperature range of 50 to 350° C. is 1.00% by mass, for example, the aromatic polyimide powder for a molded body consists of 99.00% by mass of a component which is mainly composed of an aromatic polyimide powder and does not volatilize in the temperature range of 50 to 350° C., and 1.00% by mass of the components which volatilize in the temperature range of 50 to 350° C.

The "volatile matter" content can be measured by a known analysis method such as thermogravimetric analysis. For example, in the case of using thermogravimetric analysis, a predetermined amount of the aromatic polyimide powder may be heated at a temperature increase rate of 20° C./min to a temperature higher than 350° C. to determine the total amount of volatile components which volatilize at 50° C. to 350° C., followed by calculation of the proportion of the total amount to the predetermined amount of the aromatic polyimide powder. It should be noted that the weight of the aromatic polyimide powder refers to the weight thereof measured at 25° C. Other analysis methods may be used as long as the amount of components which volatilize in the temperature range of 50 to 350° C. can be measured.

Examples of such volatile components include monomer components such as aromatic diamine components and aromatic tetracarboxylic acid components, residual solvent, additives, water, modified or decomposed products of these generated by heating, and the like. The type of such volatile components is not limited. Namely, in the present invention, the amount of volatile components is technically important, and the importance is not placed on the type of volatile components.

From the viewpoint of the mechanical properties of a molded body and the handleability of the powder, the lower limit of the content of components which volatilize in the temperature range of 50° C. to 350° C. in the aromatic polyimide powder for a molded body according to the present invention is preferably 1.00% by mass or more, more preferably 1.50% by mass or more, particularly preferably 2.00% by mass or more. Likewise, the upper limit thereof is preferably 4.30% by mass or less, more preferably 4.00% by mass or less, particularly preferably 3.00% by mass or less.

Although what is required is that the content of components which volatilize in the temperature range of 50° C. to 350° C. in the aromatic polyimide powder for a molded body according to the present invention is within the above range, from the viewpoint of providing a molded body having further enhanced mechanical properties and further enhancing the handleability of the powder, preferable are the following ranges: The content of components which volatilize in the temperature range of 150° C. to 350° C. is preferably 75.0 to 99.0% by mass relative to 100% by mass of the components which volatilize in the temperature range of 50° C. to 350° C. The lower limit thereof is more preferably 80% by mass or more, and particularly preferably 90.0% by mass or more, and the upper limit thereof is more preferably 98.0% by mass or less, and particularly preferably 97.0% by mass or less. Likewise, from the viewpoint of providing a molded body having further enhanced mechanical properties and further enhancing the handleability of the powder, the content of components which volatilize in the temperature range of 150° C. to 250° C. is preferably 50.0 to 80.0% by mass relative to 100% by mass of the components which volatilize in the temperature range of 50° C. to 350° C. The lower limit thereof is more preferably 55.0% by mass or more, particularly preferably 60.0% by mass or more, and the upper limit thereof is more preferably 75.0% by mass or less, particularly preferably 70.0% by mass or less.

Although the size of the aromatic polyimide powder for a molded body according to the present invention is not particularly limited, its average particle size is preferably 5 to 20 pm from the viewpoint of the mechanical properties of a molded body thereof and the handleability of the powder. The term "average particle size" herein refers to a value measured using a laser diffraction/scattering particle size distribution analyzer. The shape of the aromatic polyimide powder for a molded body is also not particularly limited as long as the effects of the present invention are exhibited.

It is preferable that the aromatic polyimide powder for a molded body according to the present invention be mainly composed of an aromatic polyimide containing repeating units represented by the following Chemical Formula (II). A method for producing the aromatic polyimide powder is described later.

[Chem 1]

(II)

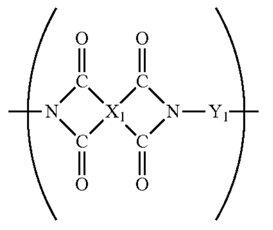

(In the formula, $X_1$s are one or more tetravalent groups in which the carboxylic group is removed from a tetracarboxylic acid having an aromatic ring, and $Y_1$s are one or more divalent groups in which the amino group is removed from a diamine having an aromatic ring.)

Each $X_1$ is preferably a tetravalent group having no substituent on the aromatic ring, and particularly preferably a tetravalent ring represented by any of the following Chemical Formulas (III) to (VII).

[Chem 2]

(III)

(IV)

(V)

(VI)

(VII)

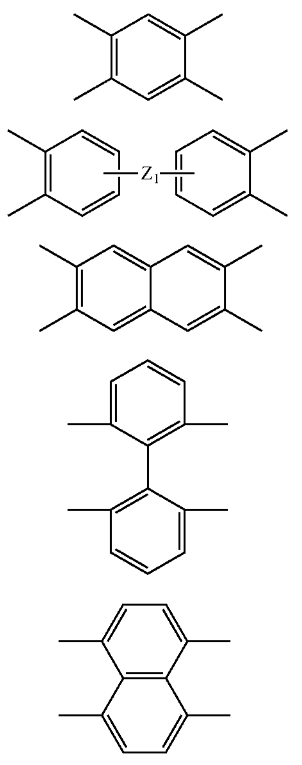

(In the formula, $Z_1$ is a direct bond or any of the following divalent groups:

[Chem 3]

(VIII)

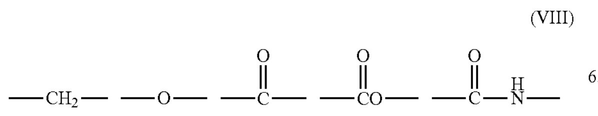

-continued

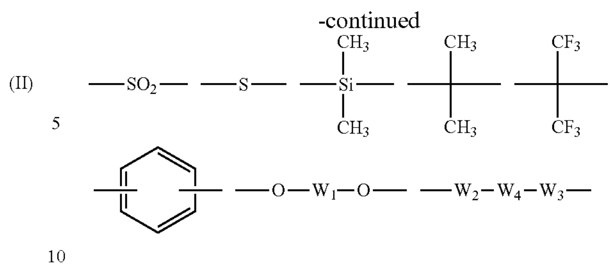

in the formulas, $W_1$ is a divalent organic group, $W_2$ and $W_3$ are each independently an amide bond, an ester bond, or a carbonyl bond, and $W_4$ is an organic group having an aromatic group.)

Specific examples of $W_1$ include aliphatic hydrocarbon groups having 2 to 24 carbon atoms and aromatic hydrocarbon groups having 6 to 24 carbon atoms.

Specific examples of $W_4$ include aromatic hydrocarbon groups having 6 to 24 carbon atoms.

Preferred examples of compounds usable as raw materials for forming the tetravalent groups represented by Chemical Formulas (III) to (VII) (also referred to as "aromatic tetracarboxylic acid components" in some cases) include tetravalent groups derived from aromatic tetracarboxylic dianhydrides such as 3,3',4,4'-biphenyltetracarboxylic dianhydride, 2,3,3',4'-biphenyltetracarboxylic dianhydride, 2,2',3,3'-biphenyltetracarboxylic dianhydride, pyromellitic dianhydride, benzophenonetetracarboxylic dianhydride, 4,4'-oxydiphthalic dianhydride, diphenylsulfonetetracarboxylic dianhydride, p-terphenyltetracarboxylic dianhydride, and m-terphenyltetracarboxylic dianhydride. From the viewpoint of the solvent resistance and the mechanical properties of a molded body of the aromatic polyimide, those derived from 3,3',4,4'-biphenyltetracarboxylic dianhydride, 2,3,3',4'-biphenyltetracarboxylic dianhydride, 2,2',3,3'-biphenyltetracarboxylic dianhydride, benzophenonetetracarboxylic dianhydride, diphenylsulfonetetracarboxylic dianhydride, p-terphenyltetracarboxylic dianhydride, and terphenyltetracarboxylic dianhydride are more preferred, and those derived from 3,3',4,4'-biphenyltetracarboxylic dianhydride and 2,3,3',4'-biphenyltetracarboxylic dianhydride are particularly preferred. These aromatic tetracarboxylic acid components may be used alone or in combination.

A tetracarboxylic acid component having a substituent on an aromatic ring may also be used as long as it does not impair the effects of the present invention. Examples thereof include halogen-substituted tetracarboxylic dianhydrides such as 5,5'-[2,2,2-trifluoro-1-[3-(trifluoromethyl)phenyl]ethylidene]diphthalic anhydride, 5,5'-[2,2,3,3,3-pentafluoro-1-(trifluoromethyl)propylidene]diphthalic anhydride, 1H-diflo[3,4-b:3',4'-i]xanthene-1,3,7,9(11H) -tetrone, 5,5'-oxybis[4,6,7-trifluoro-pyromellitic anhydride], 3,6-bis(trifluoromethyl)pyromellitic dianhydride, 4-(trifluoromethyl)pyromellitic dianhydride, 1,4-difluoropyromellitic dianhydride, and 1,4-bis(3,4-dicarboxytrifluorophenoxy)tetrafluorobenzene dianhydride. These tetracarboxylic acid components may be used alone or in combination. An appropriate one can be selected in consideration of desired properties to be imparted. The amount of the tetracarboxylic acid component having a substituent on an aromatic ring is preferably less than 5 mol % of the total amount of the tetracarboxylic acid components.

Each $Y_1$ is preferably a divalent group having no substituent on the aromatic ring, and is preferably any of divalent groups represented by the following Chemical Formulas (IX) to (X).

[Chem 4]

(IX)

(X)

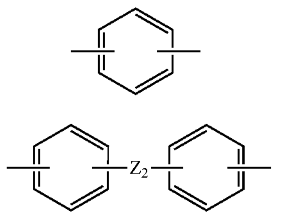

(In the formula, $Z_2$ is a divalent bond or any of the following divalent groups:

[Chem 5]

(XI)

(XII)

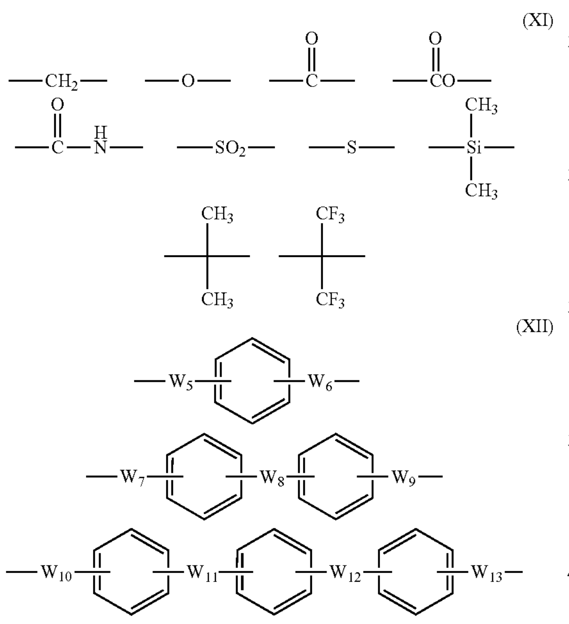

where $W_5$ to $W_{13}$ in Formula (XII) each independently represent a direct bond or any of the divalent groups represented by Formula (XI).)

Preferred examples of compounds usable as raw materials for forming the structures of Chemical Formulas (IX) to (X) (also referred to as "aromatic diamine components" in some cases) include p-phenylenediamine, m-phenylenediamine, 4,4'-diaminodiphenyl ether, 4,4'-diaminodiphenylmethane, and the like. From the viewpoint of the solvent resistance of a molded body of the aromatic polyimide, p-phenylenediamine or 4,4'-diaminodiphenyl ether is more preferably used, and from the viewpoint of the solvent resistance and the mechanical properties of a molded body of the aromatic polyimide, p-phenylenediamine is still more preferably used. These aromatic diamine components may be used alone or in combination.

A diamine component having a substituent on an aromatic ring may also be used as long as it does not impair the effects of the present invention. Examples thereof include halogen-substituted diamines such as 2,4-toluenediamine, 3,3'-dihydroxy-4,4'-diaminobiphenyl, bis(4-amino-3-carboxyphenyl) methane, 2,2'-bis(trifluoromethyl)-4,4'-diaminobiphenyl, 2,3,5,6-tetrafluoro-1,4-diaminobenzene, 2,4,5,6-tetrafluoro-1,3-diaminobenzene, 2,3,5,6-tetrafluoro-1,4-benzene(dimethaneamine), 2,2'-difluoro-(1,1'-biphenyl)-4,4'-diamine, 4,4'-diaminooctafluorobiphenyl, and 4,4'-oxybis(2,3,5,6-tetrafluoroaniline), and the like. These diamine components may be used alone or in combination. An appropriate one can be selected in consideration of desired properties to be imparted. The amount of the diamine component having a substituent on an aromatic ring is preferably less than 5 mol % of the total amount of the diamine components.

<Method for Producing Aromatic Polyimide Powder for Molded Body>

Next, a method for producing the aromatic polyimide powder for a molded body according to the present invention is described by means of a representative example. The method for producing the aromatic polyimide powder for a molded body according to the present invention is not particularly limited as long as the volatile matter content thereof can be adjusted to 0.50 to 5.00% by mass. In consideration of ease of adjusting the volatile matter content, the aromatic polyimide powder for a molded body can be produced by preparing an aromatic polyimide via a polyamic acid using the aromatic tetracarboxylic acid component and the aromatic diamine component as raw materials (hereinafter, also collectively referred to as "monomer components"), followed by a step of adjusting the volatile matter content, and lastly by pulverization.

First, the step of preparing a polyamic acid is described. The polyamic acid particularly preferably contains repeating units represented by Chemical Formula (I):

[Chem 6]

(I)

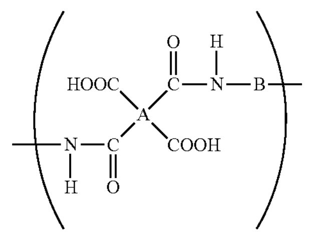

(In the formula, As are one or more groups selected from tetravalent groups in which the carboxylic acid group is removed from an aromatic tetracarboxylic acid, and Bs are one or more groups selected from divalent groups in which the amino group is removed from an aromatic diamine.)

Each A is preferably a tetravalent group having no substituent on the aromatic ring, and is particularly preferably any of the tetravalent groups represented by Chemical Formulas (III) to (VII) shown above.

Preferred examples of compounds usable as raw materials for forming the tetravalent groups represented by Chemical Formulas (III) to (VII) (also referred to as "aromatic tetracarboxylic acid components" in some cases) include tetravalent groups derived from aromatic tetracarboxylic dianhydrides such as 3,3',4,4'-biphenyltetracarboxylic dianhydride, 2,3,3',4'-biphenyltetracarboxylic dianhydride, 2,2',3,3'-biphenyltetracarboxylic dianhydride, pyromellitic dianhydride, benzophenonetetracarboxylic dianhydride, 4,4'-oxydiphthalic dianhydride, diphenylsulfonetetracarboxylic dianhydride, p-terphenyltetracarboxylic dianhydride, and m-terphenyltetracarboxylic dianhydride. From the viewpoint of the solvent resistance and mechanical properties of a molded body of the aromatic polyimide, those derived from 3,3',4,4'-biphenyltetracarboxylic dianhydride, 2,3,3',4'- biphenyltetracarboxylic dianhydride, 2,2',3,3'-biphenyltetracarboxylic dianhydride, benzophenonetetracarboxylic dianhydride, diphenylsulfonetetracarboxylic dianhydride, p-terphenyltetracarboxylic dianhydride, and m-terphenyltetracarboxylic dianhydride are more preferred, and those derived from 3,3',4,4'-biphenyltetracarboxylic dianhydride and 2,3,3',4'-biphenyltetracarboxylic dianhydride are particularly preferred. These aromatic tetracarboxylic acid components may be used alone or in combination.

A tetracarboxylic acid component having a substituent on an aromatic ring may also be used as long as it does not impair the effects of the present invention. Examples thereof include halogen-substituted tetracarboxylic dianhydrites such as 5,5'-[2,2,2-trifluoro-1-[3-(trifluoromethyl)phenyl]ethylidene]diphthalic anhydride, 5,5'-[2,2,3,3,3-pentafluoro-1-(trifluoromethyl)propylidene]diphthalic anhydride, 1H-diflo[3,4-b:3',4'-i]xanthene-1,3,7,9(11H)-tetrone, 5,5'-oxybis[4,6,7-trifluoro-pyromellitic anhydride], 3,6-bis(trifluoromethyl)pyromellitic dianhydride, 4-(trifluoromethyl)pyromellitic dianhydride, 1,4-difluoropyromellitic dianhydride, and 1,4-bis(3,4-dicarboxytrifluorophenoxy)tetrafluorobenzene dianhydride. These tetracarboxylic acid components may be used alone or in combination. An appropriate one can be selected in consideration of desired properties to be imparted. The amount of the tetracarboxylic acid component having a substituent on an aromatic ring is preferably less than 5 mol % of the total amount of the tetracarboxylic acid components.

Each B is preferably a divalent group having no substituent on the aromatic ring, and is particularly preferably any of the divalent groups represented by Chemical Formulas (IX) to (X) shown above.

Preferred examples of compounds usable as raw materials for forming the structures of Chemical Formulas (IX) to (X) (also referred to as "aromatic diamine components" in some cases) include p-phenylenediamine, m-phenylenediamine, 4,4'-diaminodiphenyl ether, 4,4'-diaminodiphenylmethane, and the like. From the viewpoint of the solvent resistance of a molded body of the aromatic polyimide, p-phenylenediamine or 4,4'-diaminodiphenyl ether is more preferably used, and from the viewpoint of the solvent resistance and the mechanical properties of a molded body of the aromatic polyimide, p-phenylenediamine is still more preferably used. These aromatic diamine components may be used alone or in combination.

A diamine component having a substituent on an aromatic ring may also be used as long as it does not impair the effects of the present invention. Examples thereof include halogen-substituted diamines such as 2,4-toluenediamine, 3,3'-dihydroxy-4,4'-diaminobiphenyl, bis(4-amino-3-carboxyphenyl)methane, 2,2'-bis(trifluoromethyl)-4,4'-diaminobiphenyl, 2,3,5,6-tetrafluoro-1,4-diaminobenzene, 2,4,5,6-tetrafluoro-1,3-diaminobenzene, 2,3,5,6-tetrafluoro-1,4-benzene(dimethaneamine), 2,2'-difluoro-(1,1'-biphenyl) -4,4'-diamine, 4,4'-diaminooctafluorobiphenyl, and 4,4'-oxybis(2,3,5,6-tetrafluoroaniline). These diamine components may be used alone or in combination. An appropriate one can be selected in consideration of desired properties to be impaled. The amount of the diamine component having a substituent on an aromatic ring is preferably less than 5 mol% of the total amount of the diamine components.

Such a polyamic acid may be obtained by using substantially equimolar amounts of the aromatic tetracarboxylic acid component and the aromatic diamine component and reacting them in a solvent, optionally under heating, to a desired viscosity (or molecular weight). It should be noted that the term "substantially equimolar amounts" herein means that the molar ratio between the aromatic tetracarboxylic acid component and the aromatic diamine component is about 0.90 to 1.10, preferably about 0.95 to 1.05. The monomer components used to form the polyamic acid are mainly composed of the tetracarboxylic acid component and the aromatic diamine component described above.

In this production method, any solvent can be used without limitation, and a known solvent used in production of a polyamic acid can be selected and used. From the viewpoint of the solubility of the monomer components or the polyamic acid, one preferred example is a solvent including at least one nitrogen-containing solvent. From the viewpoint of ease of adjusting the volatile matter content, solvents having a boiling point of 100° C. or more are preferred. Examples of such solvents include N-methyl-2-pyrrolidone, N-ethyl-2-pyrrolidone, N,N-dimethylformamide, N,N-dimethylacetamide, 1,1,3,3-tetramethylurea, 1,3-dimethyl-2-imidazolidinone, N,N-dimethylisobutylamide, N,N-dimethylpropionamide, and the like.

The polyamic acid can be produced by placing the monomer components and the solvent in a reactor equipped with a stirrer, and stirring the mixture. The raw materials can be added in any order without limitation. For example, after dissolving a predetermined amount of the aromatic diamine component in the solvent, the aromatic tetracarboxylic acid component may be added thereto. Alternatively, after dissolving the aromatic tetracarboxylic acid component in the solvent, the aromatic diamine component may be added thereto, or the aromatic tetracarboxylic acid component and the aromatic diamine component may be alternately added. If needed, additives such as a known reaction catalyst may be added at any timing.

Although there is no restriction on the reaction temperature, the reaction is preferably performed at a temperature of 0 to 100° C., more preferably 10 to 90° C., still more preferably 20 to 70° C. The reaction at a temperature controlled within the above ranges can result in a less colored aromatic polyimide powder having smaller variations in mechanical properties. The temperature may be kept constant, or may be increased or reduced appropriately.

<Preparation of Aromatic Polyimide>

The aromatic polyimide can be prepared through a known reaction such as a thermal imidization reaction involving heating a polyamic acid solution, or a chemical imidization reaction using an imidizing agent. These imidization reactions are preferably performed under an inert gas atmosphere established by introducing an inert gas such as nitrogen gas or argon gas.

The reaction temperature for the thermal imidization reaction can be appropriately set depending on the type of the monomer components and the solvent to be used. Typically, the reaction is perfoLmed at a temperature within the range of preferably 130 to 230° C., more preferably 140 to 190° C.

Examples of imidizing agents usable in the chemical imidization reaction include carboxylic anhydrides such as acetic anhydride, propionic anhydride, succinic anhydride, phthalic anhydride, and benzoic anhydride. From the viewpoint of cost effectiveness and ease of removal after the reaction, acetic anhydride is preferably used. A catalyst used to form the polyamic acid may be directly used, or a new catalyst or an additional portion may be added after preparing the polyamic acid. The amount of the imidizing agent used is equivalent to or greater than the amount of amide bonds in the polyamic acid to be imidized, and is preferably 1.1 to 5 equivalents, more preferably 1.5 to 4 equivalents relative to amide bonds. By using the imidizing agent in a slightly excessive amount relative to amide bonds, the imidization reaction is allowed to proceed efficiently even at a relatively low temperature.

From the viewpoint of reducing variations in physical properties of a molded body, the aromatic polyimide (powder) is preferably imidized to a degree of 95% or more, preferably 98% or more. The degree of imidization may be measured by infrared spectroscopy using an ordinary process.

<Formation of Aromatic Polyimide Powder>

Lastly, the step of producing an aromatic polyimide powder is described. When the aromatic polyimide is synthesized from the polyamic acid solution as described above, the aromatic polyimide is precipitated as insoluble matter in the solution system. The precipitated powder in the system is separated from the solution by filtration, and is further subjected to the volatile matter adjustment step to yield an aromatic polyimide powder.

The volatile matter adjustment step may be any step without limitation as long as the volatile matter in the aromatic polyimide powder can be adjusted. Preferably, the volatile matter adjustment step comprises a washing step and/or a drying step. In order to enhance the efficiency of the washing step and/or the drying step, an aromatic polyimide powder having a particle size close to a desired one is preferably formed in advance. For example, the imidization reaction may be perfoLmed with stirring, or after preparing an aromatic polyimide, the aromatic polyimide may be subjected to a pulverization treatment. Obviously, a combination of these may be used.

The step of washing the aromatic polyimide powder may be perfoLmed by any method without limitation, and a known method can be appropriately selected. From the viewpoint of ease of operation, a washing method can be appropriately selected such as a method involving collecting the aromatic polyimide powder by filtration, and then rinsing the aromatic polyimide powder remaining on the filter with a washing liquid, or a method involving placing the aromatic polyimide powder separated by filtration into a separate container, and introducing a washing liquid into the container followed by washing by stirring.

The washing liquid used in the washing step is not particularly limited, and may be any liquid which does not dissolve the aromatic polyimide powder. Preferred are hydrophilic solvents such as water and alcohols.

Any alcohol can be used as the washing liquid without limitation. From the viewpoint of removing the solvent, the imidizing agent, and the like included in the aromatic polyimide powder, alcohols having a total carbon number of 5 or less, such as methanol, ethanol, and isopropyl alcohol, are preferred, and isopropyl alcohol is particularly preferred. From the viewpoint of adjusting the volatile matter, a washing liquid having a boiling point of preferably 150° C. or less, more preferably 100° C. or less may be selected. These washing liquids may be used alone, or may be used as a mixture with another washing liquid as needed.

The amount of the washing liquid relative to the aromatic polyimide powder is not particularly limited. From the viewpoint of industrial productivity, its amount is preferably at most 10 times the mass of the aromatic polyimide powder immediately after filtration. The amount of the washing liquid relative to the aromatic polyimide powder herein is the amount of the washing liquid per washing.

The step of drying the aromatic polyimide powder may be performed at any temperature. For example, from the viewpoint of suppressing decomposition of the aromatic polyimide powder, the temperature is preferably 400° C. or less, more preferably 350° C. or less, still more preferably 300° C. or less, particularly preferably 200° C. or less. The lower limit of the temperature may be set to preferably 80° C. or more, more preferably 100° C. or more, particularly preferably 110° C. or more.

The drying of the aromatic polyimide powder may be performed under ambient pressure, or a reduced pressure may be employed. The drying may be performed under atmospheric air, or an inert gas atmosphere may be employed. From the viewpoint of suppressing decomposition of the aromatic polyimide powder, the drying is preferably performed under an inert gas atmosphere. Alternatively, a mixed gas atmospheric air and an inert gas can be employed, or the drying may be performed under atmospheric air followed by an inert gas atmosphere, or may be performed under an inert gas atmosphere followed by atmospheric air.

The drying time can be appropriately adjusted in consideration of the volatile matter content. From the viewpoint of industrial productivity and suppression of decomposition of the aromatic polyimide powder, the drying is performed preferably within 36 hours, more preferably within 24 hours, particularly preferably within 18 hours. The lower limit of the drying time is not particularly limited, and is preferably 30 minutes or more, more preferably 1 hour or more.

The washing step and/or the drying step described above may be repeated multiple times. The washing step and the drying step may be alternately repeated. In the case where the washing step or the drying step is performed multiple times, the multiple washing steps or drying steps may not necessarily be performed under the same conditions, and the conditions may be appropriately varied. For example, in the washing step, the type of the washing liquid, the amount of the washing liquid relative to the aromatic polyimide powder, and the like may be varied, and in the drying step, the drying temperature, the drying time, and the like may be varied.

The main purpose of general washing/drying steps is to remove volatile matter as much as possible from not only polyimide powders but also other resin powders. However, in the present invention, the volatile matter adjustment step comprising the washing step and/or the drying step is different in that the volatile matter content is adjusted to 0.50 to 5.00% by mass. To clarify the difference from general washing/drying steps, the term "volatile matter adjustment step" is used in the present invention. For example, in the case of industrially producing an aromatic polyimide powder, a large-scale production facility is required in which a large amount of raw materials is used. For this reason, the resulting aromatic polyimide powder is presumed to entirely or partially have a volatile matter content of less than 0.50% by mass. By applying (for example, spraying) a predetermined amount of an organic solvent such as those described above to such an aromatic polyimide powder having a volatile matter content of less than 0.50% by mass, its volatile matter content can be adjusted to 0.50 to 5.00% by mass. Namely, the scope of the volatile matter adjustment step is intended to encompass the step of increasing the volatile matter content as well as the step of reducing the volatile matter content. As described above, the volatile matter adjustment step is a step of adjusting its volatile matter content to 0.50 to 5.00% by mass. Examples of organic solvents which can be sprayed include the organic solvents described above and a variety of organic solvents such as acetone, methyl ethyl ketone, toluene, methanol, ethanol, isopropyl alcohol, ethyl benzoate, ethylene glycol, and propylene glycol. After spraying the organic solvent, drying may be perfoLmed as needed. Another usable process to adjust the volatile matter content is to mix the aromatic polyimide powder with the organic solvent followed by drying.

<Aromatic Polyimide Molded Body and Method for Producing Same>

An aromatic polyimide molded body according to the present invention is formed by molding the aromatic polyimide powder for a molded body according to the present invention, and has mechanical properties including a flexural strength of 60 MPa or more. The term "flexural strength" herein refers to a calculated average value of ten measurements (n=10) obtained by measuring the breaking strength of a molded body foamed under the following conditions using a flexural strength tester: The powder is placed in a powder molding machine, and is molded into a rectangular shape having 5 mm width, 40 mm length, and 4 mm thickness by uniaxial pressing at a pressure of 6000 $kgf/cm^2$ at room temperature. The rectangular molded body is subjected to pressureless firing under atmospheric air at 400° C. to form a molded body. The resulting molded body is measured using a flexural strength tester at a test speed of 0.5 mm/min, and the strength at break is regarded as its flexural strength. The flexural strength is preferably 62 MPa or more, more preferably 64 MPa or more, still more preferably 65 MPa or more. In this process, the pressureless firing may be perfoLmed under atmospheric air at a temperature of 400° C., and the other conditions are not particularly limited. Typical conditions can be as follows: increasing the temperature at 10° C./min followed by holding at 50° C. for 30 minutes, increasing the temperature at 10° C./min again followed by holding at 200° C. for 1 hour, and then increasing the temperature at 10° C./min followed by holding at 400° C. for 15 minutes. The molding time of the uniaxial pressing can be typically 1 minute.

In order to achieve such a flexural strength, any production method may be employed as long as the aromatic polyimide powder according to the present invention is used. The aromatic polyimide powder according to the present invention may be used in a molded body production method while its volatile matter content is adjusted within the above ranges. For example, the molded body can be produced by placing the aromatic polyimide powder according to the present invention in a mold, and heating and compressing the aromatic polyimide powder by simultaneously or separately applying pressure and heat. Namely, the aromatic polyimide molded body according to the present invention may be an aromatic polyimide sintered molded body foamed through molding and sintering by heating and compressing. The heating temperature and the pressure depend on the molding machine, and suitable ranges for the machine can be arbitrarily selected. In particular, in the production method according to the present invention, the presence of volatile matter in an amount within the specific range enables the aromatic polyimide to sufficiently exhibit its heat resistance. This enables molding at 300° C. or higher temperatures, and even molding at a high temperature of 400° C. or more does not result in a molded body having a poor external appearance or cracks, and can ensure desired mechanical strength. The upper limit of the heating temperature is preferably 600° C. or less, more preferably 550° C. or less, particularly preferably 500° C. or less.

Likewise, a suitable range of pressure can be selected depending on the production machine. From the viewpoint of enhancing the mechanical properties of the aromatic polyimide molded body and suppressing cracks in the aromatic polyimide molded body, the pressure is preferably 4000 $kgf/cm^2$ or more, more preferably 5000 $kgf/cm^2$ or more, particularly preferably 5500 $kgf/cm^2$ or more, and is preferably 7000 $kgf/cm^2$ or less, more preferably 6500 $kgf/cm^2$ or less. The heating/compression molding time in the heating/compression molding is preferably 10 minutes or more, more preferably 40 minutes or more, and is preferably 100 minutes or less, more preferably 60 minutes or less. The molded body obtained through heating/compression molding is preferably cooled in the mold at a rate of 5 to 10° C./min from the viewpoint of enhancing the mechanical properties of the aromatic polyimide molded body and suppressing cracks in the aromatic polyimide molded body. On the other hand, in the case of compression molding at ambient temperature, the compression molding time is preferably 30 seconds or more, more preferably 1 minute or more, and is preferably 10 minutes or less, more preferably 5 minutes or less.

The aromatic polyimide molded body according to the present invention may also be produced by compression molding at ambient temperature at the pressure defined above, and then pressureless sintering. Namely, the aromatic polyimide molded body according to the present invention may be an aromatic polyimide sintered molded body formed through molding followed by sintering. In this case, from the viewpoint of the mechanical properties of the aromatic polyimide molded body, the sintering temperature is preferably 300° C. or more, more preferably 350° C. or more, particularly preferably 400° C. or more, and is preferably 600° C. or less, more preferably 550° C. or less, particularly preferably 500° C. or less. The sintering time in the pressureless sintering is preferably 60 minutes or more, more preferably 120 minutes or more, and is preferably 240 minutes or less, more preferably 180 minutes or less. The sintered molded body is preferably cooled in the mold at a rate of 5 to 10° C./min from the viewpoint of enhancing the mechanical properties of the aromatic polyimide molded body and suppressing cracks in the molded body.

In the pressureless sintering, although the sintering temperature may be within the above ranges, the temperature increase rate during sintering is preferably 5° C./min or more, more preferably 10° C./min or more, and is preferably 30° C./min or less, more preferably 20° C./min or less. In the pressureless sintering, a temperature holding treatment for holding at a temperature may be performed in the temperature increase process. The temperature holding treatment may be performed once or multiple times in the temperature increase process. For example, in the case where the temperature holding treatment is performed 3 times, the temperature held in the second temperature holding treatment is preferably 100° C. or more, more preferably 150° C. or more, and is preferably 250° C. or less, more preferably 200° C. or less. The holding time is preferably 10 minutes or more, more preferably 30 minutes or more, and is preferably 120 minutes or less, more preferably 60 minutes or less. The temperature held in the third temperature holding treatment is preferably 350° C. or more, more preferably 400° C. or more, and is preferably 550° C. or less, more preferably 500° C. or less. The holding time is preferably 5 minutes or more, more preferably 15 minutes or more, and is preferably 60 minutes or less, more preferably 30 minutes or less.

In the process of producing the aromatic polyimide molded body, the aromatic polyimide powder may be combined and used with an arbitrary filler. Any filler can be used without limitation, and examples thereof include inorganic fillers such as glass fibers, ceramic fibers, boron fibers, glass beads, whiskers, diamond powder, alumina, silica, natural mica, synthetic mice, alumina, carbon black, silver powder, copper powder, aluminum powder, nickel powder, metal fibers, ceramic fibers, whiskers, silicon carbide, silicon oxide, alumina, magnesium powder, titanium powder, carbon fibers, and graphite, and organic fillers such as fluorine-containing resins and aramid fibers. These fillers may be used alone or in a combination of two or more fillers.

The amount of the filler used can be selected depending on the intended use. For example, the filler is used in an amount within the range of 1 to 50% by mass based on the weight of the aromatic polyimide powder.

Examples of machines for producing the aromatic polyimide molded body in the heating/compression molding include 4-column hydraulic press machines, high-pressure hot press machines, WIP systems, and the like. The preliminary molded body is preferably formed by a method using a Wet-CIP, Dry-CIP, high-pressure press, hydraulic press, rotary press, or tablet machine. The aromatic polyimide molded body according to the present invention may be produced by applying the heating/compression molding to a sheet-shaped laminate.

The aromatic polyimide powder according to the present invention can be used in a variety of production methods and allows a wide range of conditions for the methods since the properties of the aromatic polyimide can be fully demonstrated. For this reason, its industrial availability is high. In particular, since the aromatic polyimide powder can exhibit excellent mechanical properties even in the method involving compression molding at ambient temperature at the pressure defined above, and then pressureless sintering (so-called, direct forming), aromatic polyimide molded bodies of various shapes can be produced at high yield according to the present invention.

Aromatic polyimide molded bodies obtained according to the present invention can be suitably used as pins, guides, evaluation sockets, vacuum pads, and the like in semiconductor manufacturing related apparatuses, bushes, seal rings, thrust washers, bearing retainers, piston rings, locknut inserts, and the like in the automotive and aerospace industry, and bearing sleeves, roller bushes, piston rings, and the like in industrial machine related apparatuses.

EXAMPLES

Hereinafter, the present invention is more specifically described based on examples, comparative examples, and reference examples. The present invention should not be construed as limited to the examples.

The following description illustrates measurement methods used in the examples below.

<Volatile Matter Content>

About 20 mg of an aromatic polyimide powder was prepared as a test sample, and heated from 25° C. to 700° C. at a temperature increase rate of 20° C./min under a nitrogen atmosphere using a thermogravimetry apparatus. Based on the resulting weight curve, the weight reduction ratio from 50 to 350° C. was determined. In this process, the weight reduction ratio from 150 to 250° C. and the weight reduction ratio from 150 to 350° C. were also determined.

<Average Particle Size>

About 20 mg of an aromatic polyimide powder was prepared as a test sample, and measured for average particle size using a laser diffraction scattering particle size analyzer.

<Flexural Strength>

An aromatic polyimide powder was molded into an aromatic polyimide molded body having 5 mm width, 40 mm length, and 4 mm thickness by uniaxial molding for one minute at room temperature at a pressure of 6000 kgf/$cm^2$. Then, the resulting aromatic polyimide molded body was subjected to pressureless firing under atmospheric air under predetermined temperature conditions described later, and was measured using a flexural strength tester at a test speed of 0.5 mm/min. The measurement was perfoLmed ten times (n=10), and the average value thereof was regarded as its flexural strength.

The following abbreviations are used for the compounds used in the following examples.

s-BPDA: 3,3',4,4'-biphenyltetracarboxylic dianhydride
a-BPDA: 2,3,3',4'-biphenyltetracarboxylic dianhydride
PMDA: 1,2,4,5-benzenetetracarboxylic dianhydride
ODPA: 4,4'-oxydiphthalic anhydride
PPD: p-phenylenediamine
NMP: N-methyl-2-pyrrolidone
IPA: isopropyl alcohol <Preparation of Aromatic Polyimide Powder A>

240.00 g of NMP was used as a solvent, and 28.56 g of s-BPDA, 2.15 g of a-BPDA, and 11.29 g of PPD were added and dissolved with stirring. The resulting mixture was heated to 50° C. and polymerized to provide a polyamic acid solution. Thereafter, the solution was further heated to 190° C. to cause imidization and precipitate an aromatic polyimide powder. The precipitated powder was collected by filtration, washed four times with IPA, and dried for 24 hours at 100° C. under a reduced pressure of 2 kPa to provide an aromatic polyimide powder A. The volatile matter content (the content of components which volatilize in the temperature range of 50 to 350° C. (the same applies hereinafter)) of the resulting polyimide powder A was 1.03% by mass. The content of components which volatilize in the temperature range of 150 to 350° C. was 0.99% by mass (96.1% by mass of the total of all volatile matter), and the content of components which volatilize in the temperature range of 150 to 250° C. was 0.61% by mass (59.2% by mass of the total of all volatile matter).

<Preparation of Aromatic Polyimide Powder B>

An aromatic polyimide powder was precipitated in the same manner as in Preparation of aromatic polyimide powder A, and the precipitated powder was then collected by filtration, washed four times with IPA, and dried for 2 hours at 120° C. under a nitrogen atmosphere to provide an aromatic polyimide powder B. The volatile matter content of the resulting polyimide powder B was 1.50% by mass. The content of components which volatilize in the temperature range of 150 to 350° C. was 1.23% by mass (82.0% by mass of the total of all volatile matter), and the content of components which volatilize in the temperature range of 150 to 250° C. was 0.78% by mass (52.0% by mass of the total of all volatile matter).

<Preparation of Aromatic Polyimide Powder C>

An aromatic polyimide powder was precipitated in the same manner as in Preparation of aromatic polyimide powder A, and the precipitated powder was then collected by filtration, washed three times with IPA, and dried for 2 hours at 120° C. under a nitrogen atmosphere to provide an aromatic polyimide powder C. The volatile matter content of the resulting polyimide powder C was 2.10% by mass. The content of components which volatilize within the temperature range of 150 to 350° C. was 1.97% by mass (93.8% by mass of the total of all volatile matter), and the content of components which volatilize within the temperature range of 150 to 250° C. was 1.51% by mass (71.9% by mass of the total of all volatile matter).

<Preparation of Aromatic Polyimide Powder D>

An aromatic polyimide powder was precipitated in the same manner as in Preparation of aromatic polyimide powder A, and the precipitated powder was then collected by filtration, washed two times with IPA, and dried for 2 hours at 120° C. under a nitrogen atmosphere to provide an aromatic polyimide powder D. The volatile matter content of the resulting polyimide powder D was 4.23% by mass. The content of components which volatilize within the temperature range of 150 to 350° C. was 3.27% by mass (77.3% by mass of the total of all volatile matter), and the content of components which volatilize within the temperature range of 150 to 250° C. was 2.81% by mass (66.4% by mass of the total of all volatile matter).

<Preparation of Aromatic Polyimide Powder E>

An aromatic polyimide powder was precipitated in the same manner as in Preparation of aromatic polyimide powder A, and the precipitated powder was then collected by filtration, washed four times with IPA, and dried for 8 hours at 260° C. under a nitrogen atmosphere to provide an aromatic polyimide powder E. The volatile matter content of the resulting polyimide powder E was 0.08% by mass.

<Preparation of Aromatic Polyimide Powder F>

An aromatic polyimide powder was precipitated in the same manner as in Preparation of aromatic polyimide powder A, and the precipitated powder was then collected by filtration, washed four times with IPA, and dried for 24 hours at 250° C. under a reduced pressure of 2 kPa to provide an aromatic polyimide powder F. The volatile matter content of the resulting polyimide powder F was 0.20% by mass.

<Preparation of Aromatic Polyimide Powder G>

An aromatic polyimide powder was precipitated in the same manner as in Preparation of aromatic polyimide powder A, and the precipitated powder was then collected by filtration, washed four times with IPA, and dried for 18 hours at 225° C. under a reduced pressure of 2 kPa to provide an aromatic polyimide powder G. The volatile matter content of the resulting polyimide powder G was 0.49% by mass.

<Preparation of Aromatic Polyimide Powder H>

An aromatic polyimide powder was precipitated in the same manner as in Preparation of aromatic polyimide powder A, and the precipitated powder was then collected by filtration, washed once with IPA, and dried for 24 hours at 100° C. under a reduced pressure of 2 kPa to provide an aromatic polyimide powder H. The volatile matter content of the resulting polyimide powder H was 5.62% by mass.

<Preparation of Aromatic Polyimide Powder I>

An aromatic polyimide powder was precipitated in the same manner as in Preparation of aromatic polyimide powder A, and the precipitated powder was then collected by filtration, washed once with IPA, and dried for 2 hours at 120° C. under a nitrogen atmosphere to provide an aromatic polyimide powder I. The volatile matter content of the resulting polyimide powder I was 10.49% by mass.

<Preparation of Aromatic Polyimide Powder J>

An aromatic polyimide powder was precipitated in the same manner as in Preparation of aromatic polyimide powder A, and the precipitated powder was then collected by filtration, and dried for 2 hours at 120° C. under a nitrogen atmosphere to provide an aromatic polyimide powder J. The volatile matter content of the resulting polyimide powder J was 50.00% by mass.

<Preparation of Aromatic Polyimide Powder K>

A 7 g portion of the aromatic polyimide powder A prepared as described above was prepared, combined with 1 g of ethyl benzoate and 29 g of acetone, and stirred. Subsequently, the aromatic polyimide powder combined with ethyl acetate and acetone was dried for 2 hours at 120° C. under a nitrogen atmosphere to provide an aromatic polyimide powder K. The volatile matter content of the resulting polyimide powder K was 0.98% by mass.

<Preparation of Aromatic Polyimide Powder L>

A 6 g portion of the aromatic polyimide powder A prepared as described above was prepared, combined with 1 g of NMP and 29 g of acetone, and stirred. Subsequently, the aromatic polyimide powder combined with NMP and acetone was dried for 2 hours at 120° C. under a nitrogen atmosphere to provide an aromatic polyimide powder L. The volatile matter content of the resulting polyimide powder L was 4.13% by mass.

EXAMPLE 1

The aromatic polyimide powder A obtained above was placed in a mold, and was formed into an aromatic polyimide molded body having 5 mm width, 40 mm length, and 4 mm thickness by uniaxial molding using a powder molding machine for one minute at room temperature and a pressure of 6000 kgf/cm$^2$. The resulting aromatic polyimide molded body was subjected to pressureless firing at 400° C. under an ambient atmospheric air, and was then tested for flexural strength. The result is shown in Table 1. The specific firing conditions were as follows: The temperature was increased at 10° C./min, followed by holding at 50° C. for 30 minutes. The temperature was increased at 10° C./min again, followed by holding at 200° C. for 1 hour. Subsequently, the temperature was increased at 10° C./min followed by holding at 400° C. for 15 minutes and lastly by cooling at 10° C./min.

EXAMPLE 2

An aromatic polyimide molded body was obtained in the same manner as in Example 1, except that the aromatic polyimide powder B was used in place of the aromatic polyimide powder A. The resulting aromatic polyimide molded body was tested for flexural strength. The result is shown in Table 1.

EXAMPLE 3

An aromatic polyimide molded body was obtained in the same manner as in Example 1, except that the aromatic polyimide powder C was used in place of the aromatic polyimide powder A. The resulting aromatic polyimide molded body was tested for flexural strength. The result is shown in Table 1.

EXAMPLE 4

An aromatic polyimide molded body was obtained in the same manner as in Example 1, except that the aromatic polyimide powder D was used in place of the aromatic polyimide powder A. The resulting aromatic polyimide molded body was tested for flexural strength. The result is shown in Table 1.

COMPARATIVE EXAMPLE 1

An aromatic polyimide molded body was obtained in the same manner as in Example 1, except that the aromatic polyimide powder E was used in place of the aromatic polyimide powder A. The resulting aromatic polyimide molded body was tested for flexural strength. The result is shown in Table 2.

COMPARATIVE EXAMPLE 2

An aromatic polyimide molded body was obtained in the same manner as in Example 1, except that the aromatic polyimide powder F was used in place of the aromatic polyimide powder A. The resulting aromatic polyimide molded body was tested for flexural strength. The result is shown in Table 2.

COMPARATIVE EXAMPLE 3

An aromatic polyimide molded body was obtained in the same manner as in Example 1, except that the aromatic polyimide powder G was used in place of the aromatic polyimide powder A. The resulting aromatic polyimide molded body was tested for flexural strength. The result is shown in Table 2.

COMPARATIVE EXAMPLE 4

An aromatic polyimide molded body was obtained in the same manner as in Example 1, except that the aromatic polyimide powder H was used in place of the aromatic polyimide powder A. The resulting aromatic polyimide molded body was tested for flexural strength. The result is shown in Table 2.

COMPARATIVE EXAMPLE 5

An aromatic polyimide molded body was obtained in the same manner as in Example 1, except that the aromatic polyimide powder I was used in place of the aromatic polyimide powder A. The resulting aromatic polyimide molded body was tested for flexural strength. The result is shown in Table 2.

COMPARATIVE EXAMPLE 6

An attempt to perform the same molding process as in Example 1 using the aromatic polyimide powder J in place of the aromatic polyimide powder A failed to successfully provide a molded object (not moldable).

EXAMPLE 5

An aromatic polyimide molded body was obtained in the same manner as in Example 1, except that the aromatic polyimide powder K was used in place of the aromatic polyimide powder A. The resulting aromatic polyimide molded body was tested for flexural strength. The result is shown in Table 3.

EXAMPLE 6

An aromatic polyimide molded body was obtained in the same manner as in Example 1, except that the aromatic polyimide powder L was used in place of the aromatic polyimide powder A. The resulting aromatic polyimide molded body was tested for flexural strength. The result is shown in Table 3.

EXAMPLE 7

The aromatic polyimide powder A was formed into an aromatic polyimide molded body having 5 mm width, 40 mm length, and 4 mm thickness by uniaxial molding in the same manner as in Example 1. The resulting molded body was subjected to pressureless firing under an ambient atmospheric air under the conditions shown in Table 4, and was then tested for flexural strength. The result is shown in Table 4.

EXAMPLE 8

The aromatic polyimide powder A was formed into an aromatic polyimide molded body having 5 mm width, 40 mm length, and 4 mm thickness by uniaxial molding in the same manner as in Example 1. The resulting molded body was subjected to pressureless firing under an ambient atmospheric air under the conditions shown in Table 4, and was then tested for flexural strength. The result is shown in Table 4.

TABLE 1

| | | Example 1 | Example 2 | Example 3 | Example 4 |
|---|---|---|---|---|---|
| Aromatic polyimide powder | | A | B | C | D |
| Volatile matter content | % by mass | 1.03 | 1.5 | 2.1 | 4.23 |
| Average particle size | μm | 11.7 | 11.7 | 11.7 | 11.7 |
| Evaluation of aromatic polyimide molded body | | | | | |
| Flexural strength | MPa | 66 | 65 | 68 | 64 |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| Aromatic polyimide powder | | E | F | G | H | I | J |
| Volatile matter content | % by mass | 0.06 | 0.2 | 0.49 | 5.62 | 10.49 | 50 |
| Average particle size | μm | 12.6 | 12.6 | 12.7 | 12.2 | 11.7 | 11.7 |
| Evaluation of aromatic polyimide molded body | | | | | | | |
| Flexural strength | MPa | 51 | 54 | 55 | 53 | 45 | — |

TABLE 3

| | | Example 5 | Example 6 |
|---|---|---|---|
| Aromatic polyimide powder | | K | L |
| Volatile matter content | % by mass | 0.98 | 4.13 |
| Average particle size | μm | 11.7 | 11.7 |
| Evaluation of aromatic polyimide molded body | | | |
| Flexural strength | MPa | 66 | 66 |

TABLE 4

| | | Example 1 | Example 7 | Example 8 |
|---|---|---|---|---|
| Aromatic polyimide powder | | A | A | A |
| Firing conditions | | | | |
| Atmosphere | | Ambient air | Ambient air | Ambient air |
| Temperature increase rate | ° C/min | 10 | 10 | 10 |
| Lower holding temperature | ° C | 50 | 50 | 50 |
| Lower temperature holding time | min | 30 | 30 | 30 |
| Higher holding temperature | ° C | 200 | 200 | 200 |
| Higher temperature holding time | min | 60 | 60 | 60 |
| Firing temperature | ° C | 400 | 350 | 400 |
| Firing time | min | 15 | 15 | 60 |
| Evaluation of aromatic polyimide molded body | | | | |
| Flexural strength | MPa | 66 | 68 | 72 |

The evaluation of the solvent resistance of the molded bodies revealed that the molded bodies formed by molding the aromatic polyimide powders in Examples 1 to 8 had excellent solvent resistance comparable to those of the molded bodies formed by molding the aromatic polyimide powders having a small volatile matter content in Comparative Examples 1 to 3. On the other hand, higher volatile matter content was associated with poorer solvent resistance.

INDUSTRIAL AVAILABILITY

The aromatic polyimide powder according to the present invention can provide an aromatic polyimide molded body having excellent mechanical properties without deteriorating solvent resistance. Also provided is a method for improving the mechanical strength of an aromatic polyimide molded body.

The invention claimed is:

1. An aromatic polyimide powder for a molded body, wherein a volatile matter content contained in the aromatic polyimide powder is 1.03 to 5.00% by mass relative to 100% by mass of the aromatic polyimide powder of 25° C., and when molded, the aromatic polyimide powder provides an aromatic polyimide molded body having a flexural strength of 60 MPa or more, wherein the aromatic polyimide molded body is obtained by uniaxially pressing the aromatic polyimide powder at a pressure of 6000 kgf/cm2 at room temperature and pressureless firing an obtained uniaxially pressed body under atmospheric air at a temperature of 400° C. without going through a heating and compressing process of simultaneously applying pressure and heat, wherein the aromatic polyimide powder comprises an aromatic polyimide containing a unit derived from 2,3,3',4'-biphenyltetracarboxylic dianhydride.

2. A method for producing the aromatic polyimide powder for a molded body according to claim 1, the method comprising adjusting the total volatile matter content of the aromatic polyimide powder within the range of 0.50 to 5.00% by mass relative to 100% by mass of the aromatic polyimide powder of 25° C.

3. The method for producing the aromatic polyimide powder for a molded body according to claim 2, wherein the adjusting comprises washing and/or drying.

4. The method for producing the aromatic polyimide powder for a molded body according to claim 3, wherein the washing comprises using an alcohol.

5. An aromatic polyimide molded body formed by molding the aromatic polyimide powder for a molded body according to claim 1, and having a flexural strength of 60 MPa or more.

6. A method for improving the mechanical strength of an aromatic polyimide molded body, the method comprising adjusting the volatile matter content of an aromatic polyimide powder as a raw material to 1.03 to 5.00% by mass relative to 100% by mass of the aromatic polyimide powder of 25° C., wherein the aromatic polyimide molded body is obtained by uniaxially pressing the aromatic polyimide powder as the raw material at a pressure of 4000 to 7000 kgf/cm2 at room temperature and pressureless firing an obtained uniaxially pressed body under atmospheric air without going through a heating and compressing process of simultaneously applying pressure and heat, and the aromatic polyimide powder comprises an aromatic polyimide containing a unit derived from 2,3,3',4'-biphenyltetracarboxylic dianhydride.

* * * * *